United States Patent
Hara et al.

(10) Patent No.: US 9,182,235 B2
(45) Date of Patent: Nov. 10, 2015

(54) LOCUS CORRECTING METHOD, LOCUS CORRECTING APPARATUS, AND MOBILE OBJECT EQUIPMENT

(75) Inventors: Yoshitaka Hara, Tokyo (JP); Akira Oshima, Tokyo (JP); Kenjiro Yamamoto, Tokyo (JP); Yuji Hosoda, Tokyo (JP)

(73) Assignee: HITACHI, LTD., Tokyo (JP)

(*) Notice: Subject to any disclaimer, the term of this patent is extended or adjusted under 35 U.S.C. 154(b) by 2 days.

(21) Appl. No.: 14/118,899

(22) PCT Filed: May 20, 2011

(86) PCT No.: PCT/JP2011/061685
§ 371 (c)(1),
(2), (4) Date: Nov. 20, 2013

(87) PCT Pub. No.: WO2012/160630
PCT Pub. Date: Nov. 29, 2012

(65) Prior Publication Data
US 2014/0088863 A1    Mar. 27, 2014

(51) Int. Cl.
*G01C 21/00* (2006.01)
*G01C 21/30* (2006.01)

(52) U.S. Cl.
CPC .............. *G01C 21/005* (2013.01); *G01C 21/30* (2013.01)

(58) Field of Classification Search
None
See application file for complete search history.

(56) References Cited

U.S. PATENT DOCUMENTS

| | | | |
|---|---|---|---|
| 5,957,984 A * | 9/1999 | Rencken | 701/23 |
| 2008/0228395 A1* | 9/2008 | Kobori et al. | 701/208 |
| 2010/0004856 A1* | 1/2010 | Kobori et al. | 701/208 |
| 2011/0010033 A1* | 1/2011 | Asahara et al. | 701/26 |

FOREIGN PATENT DOCUMENTS

| | | |
|---|---|---|
| JP | 2002-357437 | 12/2002 |
| JP | 2004-110802 | 4/2004 |
| JP | 2008-002906 | 1/2008 |
| JP | 2008-26282 | 2/2008 |
| JP | 2008-76348 | 4/2008 |
| JP | 2008-175786 | 7/2008 |

* cited by examiner

*Primary Examiner* — Mussa A Shaawat
(74) *Attorney, Agent, or Firm* — Baker Botts L.L.P.

(57) ABSTRACT

Calculating a highly accurate locus is a goal. An administrative part (20) for correcting a traveling locus of a mobile object (V) is characterized by including an evaluation function generating unit (21) that sets a plurality of nodes on locus data of the mobile object (V) acquired by a wheel rotation quantity measuring unit (16), correlates position data of the mobile object (V) acquired by the wheel rotation quantity measuring unit (16) to the nodes and correlates position data of the mobile object (V) acquired by other units of measurement means than the wheel rotation quantity measuring unit to the nodes, represents positions at which the nodes may occur by probability, represents positions at which position data correlated to the nodes may occur by probability, and calculates an evaluation function including the nodes and the position data as variables, based on each probability; and a locus optimization calculation unit (22) that calculates a locus on which each node occurs with largest probability, based on the evaluation function.

5 Claims, 12 Drawing Sheets

LOCUS CORRECTING METHOD, LOCUS CORRECTING APPARATUS, AND MOBILE OBJECT EQUIPMENT

TECHNICAL FIELD

The present invention relates to a technique involving a locus correcting method, a locus correcting apparatus, and a mobile object equipment for correcting the locus of a mobile object.

BACKGROUND ART

An autonomous mobile system has heretofore been disclosed that estimates its location and moves along an intended route, while generating a map which is adapted to actual environment based on data measured by measuring devices (internal and external sensors) mounted in a mobile object (refer to, e.g., Patent Literatures 1 and 2).

In Patent Literature 1, disclosed are an environment identifying apparatus, an environment identifying method, a program, a recording medium, and a robot apparatus for autonomously moving, while recognizing a particular shape as a landmark and generating a map through the use of a camera as an external sensor.

In Patent Literature 2, disclosed are an environmental map making method and a mobile robot for making a map in such a way as to extend a region in which surrounding object shape data was measured by matching (overlaying) surrounding object shape data acquired at the current time instant against (on) surrounding object shape data acquired at the previous time instant and in a different position than the current position sequentially in time.

CITATION LIST

Patent Literature

Patent Literature 1: Japanese Unexamined Patent Application Publication No. 2004-110802
Patent Literature 2: Japanese Unexamined Patent Application Publication No. 2008-276348

SUMMARY OF INVENTION

Technical Problem

As a mobile object travels and its locus is acquired, a measurement error (deviation) in the acquired locus occurs. Hence, the way of making a map sequentially in time as in the related art has a problem in which a cumulative error becomes larger as the region of the map being made extends. Especially, when the mobile object passed a previously visited spot again by traveling a different route or when a map was made with a plurality of vehicles, measurement errors may cause a same spot to be stored as a different spot on the map, consistency cannot be maintained, and variation may arise. In consequence, the accuracy of the map deteriorates and such a problem is posed that the mobile object may lose sight of its location and have difficulty in continuing to move.

The present invention has been made in view of the above-described background and the present invention is intended to calculate a highly accurate locus.

Solution to Problem

To solve the problems noted above, the present invention resides in a locus correcting method for correcting a traveling locus of a mobile object by a locus correcting apparatus, characterized in that the locus correcting apparatus sets a plurality of nodes on locus data of the mobile object acquired by one unit of measurement means, correlates position data of the mobile object acquired by the one unit of measurement means to the nodes and correlates position data of the mobile object acquired by other units of measurement means than the one unit of measurement means to the nodes, represents positions at which the nodes may occur by probability, represents positions at which position data correlated to the nodes may occur by probability, calculates an evaluation function including the nodes and the position data as variables, based on each probability, and calculates a locus on which each node occurs with largest probability, based on the evaluation function.

Advantageous Effects of Invention

According to the present invention, it is possible to calculate a highly accurate locus.

DESCRIPTION OF EMBODIMENTS

Figure 1:
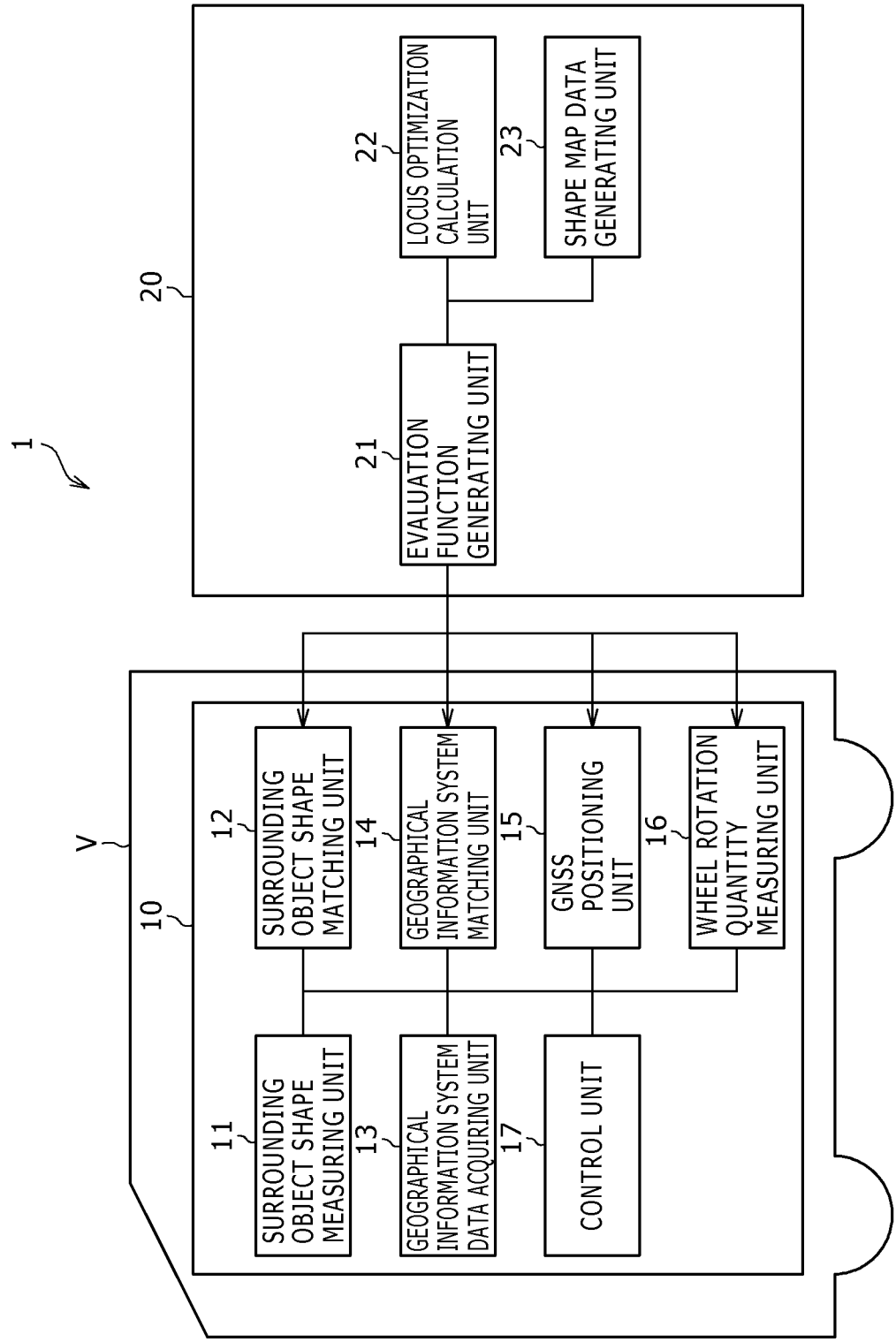
FIG. 1 is a diagram depicting a configuration example of an autonomous mobile system pertinent to an embodiment described herein.

Then, an embodiment for carrying out the present invention (which is referred to as "embodiment") is described in detail, while referring to the drawings appropriately.

[System Configuration]

FIG. 1 is a diagram depicting a configuration example of an autonomous mobile system pertinent to the present embodiment.

The autonomous mobile system 1 includes an onboard part 10 which collects every data required for making a map and an administrative part 20 which executes locus correction based on every data collected.

The onboard part 10 is mounted in a mobile object V which is a mobile object equipment such as, for example, an autonomous mobile robot and a vehicle. The administrative part 20 is installed in an administrative facility such as, for example, an office building.

The onboard part 10 and the administrative part 20 can be communicated with each other via a wireless network or the like.

Onboard Part

The onboard part 10 includes a surrounding object shape measuring unit 11, a surrounding object shape matching unit 12, a geographical information system data acquiring unit 13, a geographical information system matching unit 14, a GNSS (Global Navigation Satellite System) positioning unit 15, a wheel rotation quantity measuring unit 16, a control unit 17, and others. In some cases, the surrounding object shape matching unit 12, the geographical information system matching unit 14, the GNSS positioning unit 15, and the wheel rotation quantity measuring unit 16 are collectively referred to as measurement means.

The surrounding object shape measuring unit 11 measures the shapes of objects (roadside structures such as buildings, boulevard trees, and power poles, persons, other mobile objects V, etc.) existing around a mobile object V. As the surrounding object shape measuring unit 11, for example, a laser scanner, a stereo camera, a TOF (Time Of Flight) range image camera, and others can be used.

The surrounding object shape matching unit 12 calculates a difference in a point-to-point relative position of the mobile object V from a previous time instant by matching (overlaying) surrounding object shape data (structure shape data) measured by the surrounding object shape measuring unit 11 of the mobile object V in the current position against (on) surrounding object shape data measured in a different position. For matching, for example, a method described in a paper "Range Data Processing; Technique for Generating a Shape Model from Multiple Range Images" (authored by Ken Masuda, Ikuko Okaya (Shimizu), Tatuaki Sagawa, Proc. of the 146th CVIM conference held in 2004) can be used, among others.

The geographical information system data acquiring unit 13 is a portion that acquires shape data on a map for road configurations in a city and roadside structures such as buildings, boulevard trees, and power poles from a geographical information system having map data or the like. As a data form of the shape data on a map, inter alia, a city 3D model which is lately used in a car navigation system and a CityGML (Geography Markup Language) which is standardized worldwide by OGC (Open Geospatial Consortium) can be used.

The geographical information system matching unit 14 calculates a difference in relative position of the current position of the mobile object V from a previous time instant on a map possessed by the geographical information system by matching (overlaying) surrounding object shape data measured by the surrounding object shape measuring unit 11 of the mobile object V in the current position against (on) shape data on the map for surrounding objects in the vicinity of the current position, acquired by the geographical information system data acquiring unit 13. For matching, the same method as used by the surrounding object shape matching unit 12 can be used.

The GNSS positioning unit 15 calculates the current position of the mobile object V on a normal coordinate system such as, for example, a plane rectangular coordinate system through the use of a positioning system such as GPS (Global Positioning System).

The wheel rotation quantity measuring unit 16 calculates a relative difference of the current position of the mobile object V against the position of the mobile object V at a previous time instant by accumulating wheel rotations. For calculation, a method described in a paper "Gyrodometry: A New Method for Combining Data from Gyros and Odometry in Mobile Robots" (authored by Johann Borenstein and Liqiang Feng, Proc. of the ICRA'96 conference held in 1996) can be used, among others, through the use of an inertial sensor called an IMU (Inertial Measurement Unit) or a gyro sensor.

The onboard part 10 may not include all the respective units 11 to 16 and may include at least two of them.

The control unit 17 exerts overall control of the respective units 11 to 16.

The respective units 11 to 17 are embodied by executing programs stored in a ROM (Read Only Memory) or the like by a CPU (Central Processing Unit).

Administrative Part

The administrative part 20 includes an evaluation function generating unit 21, a locus optimization calculation unit 22, and a shape map data generating unit 23.

The evaluation function generating unit 21 is a portion that uses a difference in relative position of the mobile object V from a previous time instant calculated by each unit of measurement means 11 to 16 (details hereof will be described later) and generates an evaluation function regarding a locus of the mobile object V traveling in a traveling environment. The locus is represented by a probability function in which a difference in relative position measured respectively is assigned as a variable. By determining a variable (i.e., a difference in relative position) when the evaluation function is optimized, an error in the locus is corrected. Details hereof will be described later.

The locus optimization calculation unit 22 optimizes the evaluation function generated by the evaluation function generating unit 21 by assigning a difference in relative position as a variable. Thereby, the locus optimization calculation unit 22 rectifies the locus of the mobile object V with a cumulative error occurring in it to a locus of the mobile object V in which no cumulative error exists and consistency is maintained throughout. Details hereof will be described later.

The shape map data generating unit 23 generates a map without a cumulative error by pasting surrounding object shape data measured by the surrounding object shape measuring unit 11 to the locus of the mobile object V rectified by the locus optimization calculation unit 22.

The administrative part 20 is realized by a PC (Personal Computer) or the like and the respective units 21 to 23 are embodied by loading programs stored in a ROM or HDD (Hard Disk Drive) into a RAM (Random Access Memory) and executing the programs by the CPU.

[Flowchart]

Then, descriptions are provided for concrete processing details of the autonomous mobile system 1 pertinent to the present embodiment by following FIGS. 2 through 9, while referring to FIG. 1.

Figure 2:
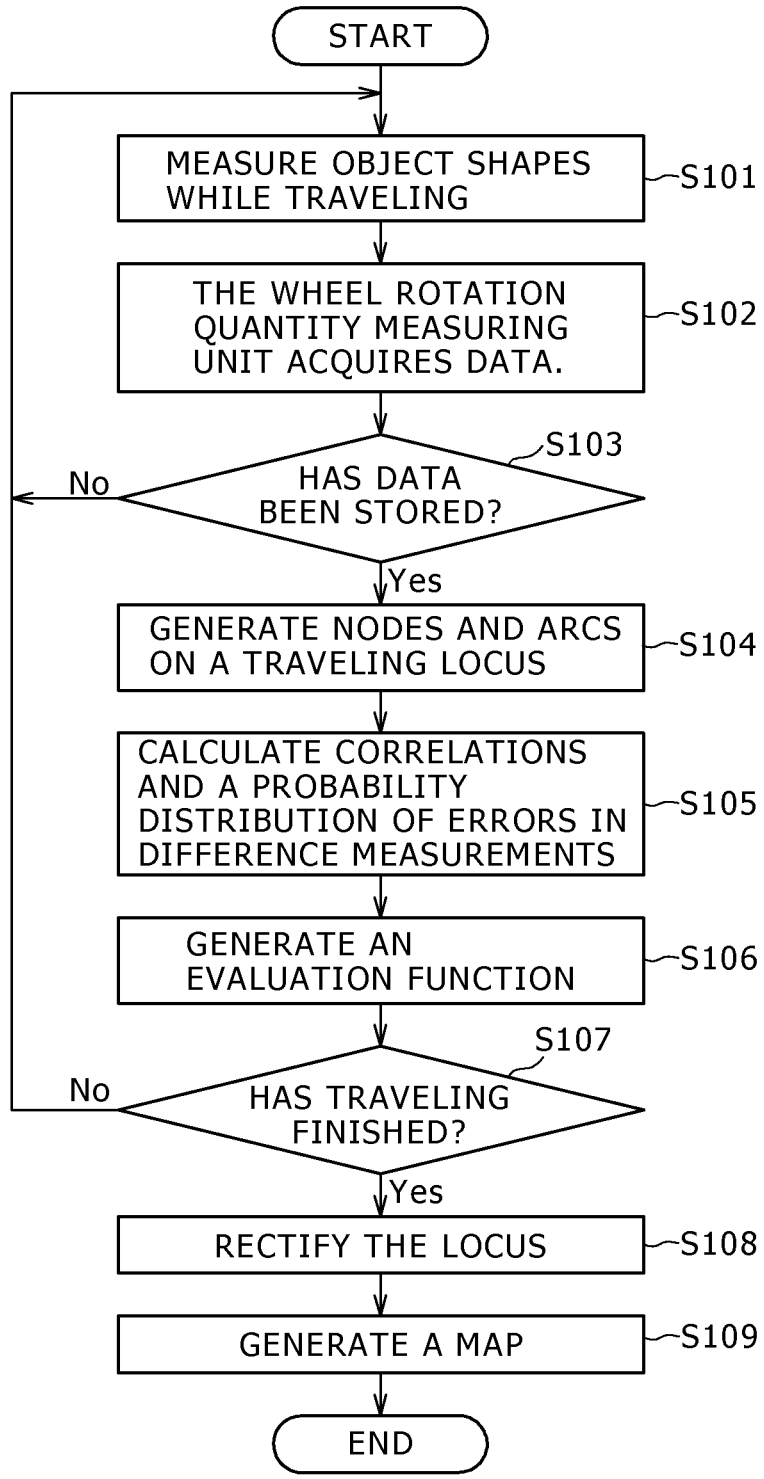
FIG. 2 is a flowchart illustrating a processing procedure of the autonomous mobile system pertinent to the present embodiment.

FIG. 2 is a flowchart illustrating a processing procedure of the autonomous mobile system pertinent to the present embodiment.

The autonomous mobile system 1 calculates an accurate locus and generates a map based on the locus by executing the process of the flowchart illustrated in FIG. 2, so that the mobile object V can reach its destination without losing sight of its location and an intended route.

First, while the mobile object V travels in a traveling environment for an intended interval, the surrounding object shape measuring unit 11 measures the shapes of objects (roadside structures such as buildings, boulevard trees, and power poles, persons, other mobile objects V, etc.) (object shapes) existing around the mobile object V (S101). The traveling which is mentioned here may mean autonomous traveling by the mobile object V or driving the mobile object by its driver.

Figure 3:
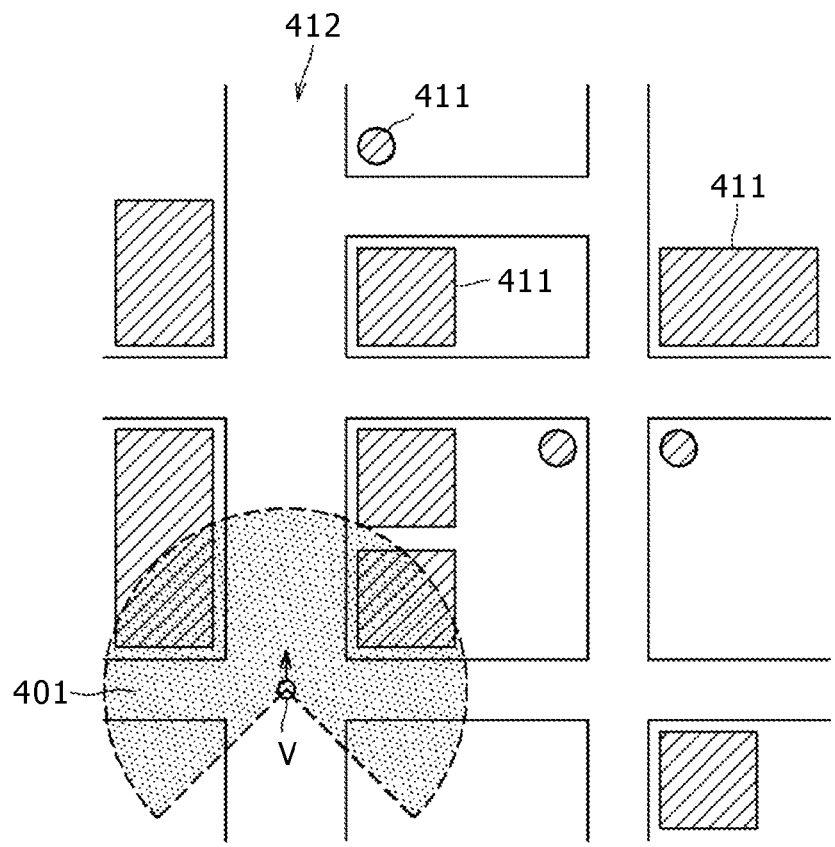
FIG. 3 is a diagram for describing measuring object shapes by a surrounding object shape measuring unit (Part 1).
Figure 4:
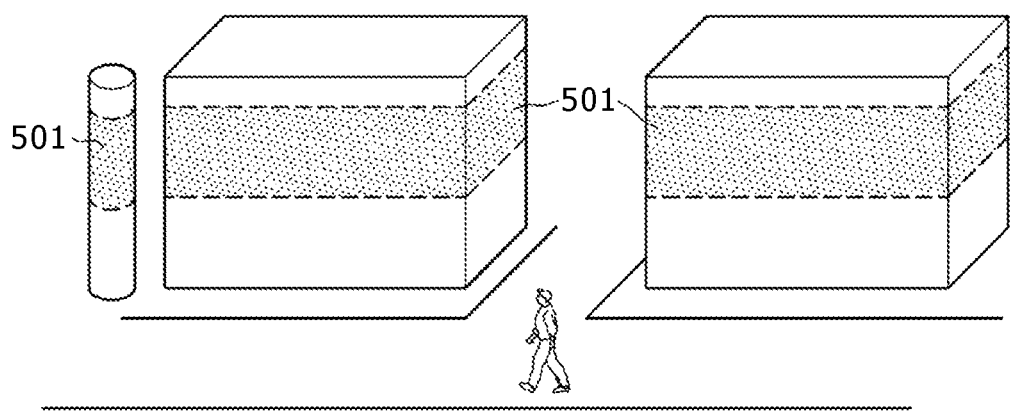
FIG. 4 is a diagram for describing measuring object shapes by the surrounding object shape measuring unit (Part 2).

Referring to FIG. 3 and FIG. 4, measuring object shapes by the surrounding object shape measuring unit is described.

The surrounding object shape measuring unit 11 measures the shapes of objects such as roadside structures 411 falling within its measurement range 401 centered around the mobile object V traveling in a region (road) 412 in which it can travel in FIG. 3.

This is, for example, done in such a way that the surrounding object shape measuring unit 11 radiates laser to surroundings and measures the shapes of surrounding objects by reflection of the laser.

In order to avoid storing mobile objects V such as persons and other mobile objects V as map data during this measurement, the surrounding object shape measuring unit 11 may extract only shape data of surrounding objects within a given range of heights 501 as depicted in FIG. 4. Alternatively, the surrounding object shape measuring unit 11 may extract only shape data of distinctive surrounding objects such as a flat surface and a column.

Then, each unit of measurement means 12 and 14 to 16 acquires measurement data (S102). At the same time, each unit of measurement means 12 and 14 to 16 sends the measurement data to the administrative part 20.

Next, the control unit 17 determines whether a predetermined amount of measurement data has been stored (S103).

As a result of the step 103, if a predetermined amount of measurement data has not been stored (No, S103), the control unit 17 returns the process to step S101.

As a result of the step 103, if a predetermined amount of measurement data has been stored (Yes, S103), the evaluation function generating unit 21 generates a graph geometry by generating nodes and arcs on a traveling locus of the mobile object V which is created based on the sent data.

Figure 5:
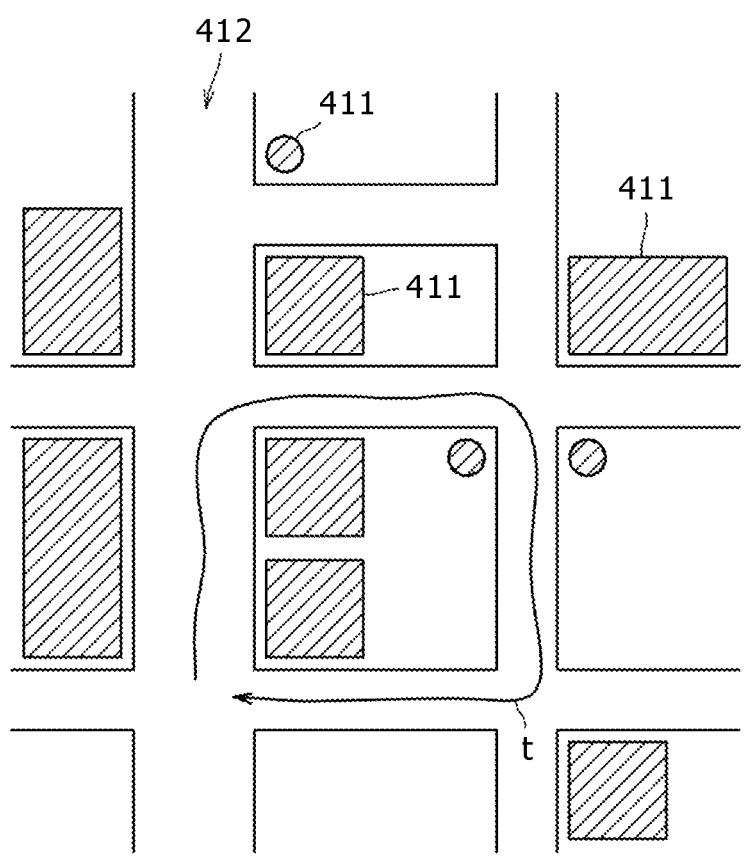
FIG. 5 is a diagram presenting an example of a traveling locus of a mobile object.
Figure 6:
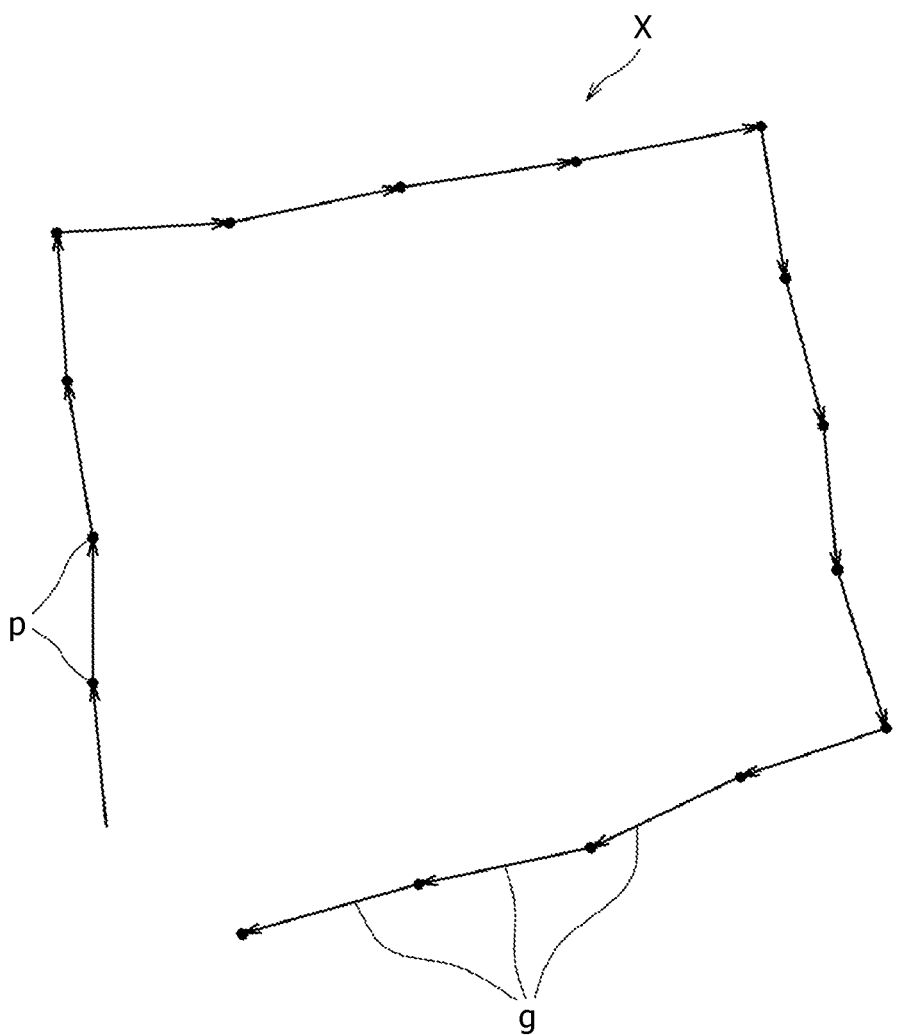
FIG. 6 is a diagram a traveling locus of a locus made up of nodes and arcs.

Now, referring to FIG. 5 and FIG. 6, generating nodes and arcs by the evaluation function generating unit 21 is described. In FIG. 5, elements corresponding to those in FIG. 3 are assigned the same reference numerals and their description is omitted.

In FIG. 5, a traveling locus t represents an example of a traveling locus along which the mobile object V actually traveled.

As depicted in FIG. 5, the mobile object V is assumed to be traveling along the actual traveling locus t. The traveling locus t is calculated based on a distance that is measured from the number of wheel rotations measured by the wheel rotation quantity measuring unit 16. In fact, the traveling locus t is closed.

FIG. 6 is a diagram for explaining a relation between nodes and arcs.

As depicted in FIG. 6, the evaluation function generating unit 21 divides the traveling locus t (FIG. 5) into segments of a given length, represents segment points as nodes p, generates a graph geometry by connecting the nodes p by linear arcs g, and generates a locus X.

When doing so, the evaluation function generating unit 21 assumes the position of the mobile object V calculated by accumulating wheel rotations by the wheel rotation quantity measuring unit 16 as an initial position and generates the nodes p and arcs g.

Because a cumulative error occurs in measurements taken by the wheel rotation quantity measuring unit 16, it follows that a measurement error (deviation) occurs in the graph geometry (locus X) generated by the evaluation function generating unit 21, depicted in FIG. 6, as against the traveling locus t in the actual environment, depicted in FIG. 5. To rectify this measurement error (deviation) and generate an accurate map, the autonomous mobile system 1 executes subsequent steps (S105 to S109) of the processing procedure in the flowchart presented in FIG. 2.

Let us denote an i-th node p as node $p_i$ and its position by vector $x_i$. If, for example, a 2D map is generated, vector $x_i$, the position of the node $p_i$ is expressed as in Equation (1).

$$x_i = (u_i, v_i, \theta_i) \qquad (1)$$

Here, $u_i$ and $v_i$ are, for example, world coordinates and $\theta_i$ is the orientation of the mobile object V.

Then, the locus X represented by the nodes p and arcs g is expressed as a set of vectors $x_i$ that represent the positions of n pieces of nodes $p_i$ as in Equation (2).

$$X = (x_1, \ldots, x_n)^T \qquad (2)$$

Here, n is the number of the nodes.

Next, with respect to the graph geometry which is made up of the nodes p and arcs g, generated by the evaluation function generating unit 21 in step S104, the surrounding object shape matching unit 12, the geographical information system matching unit 14, the GNSS positioning unit 15, and the wheel rotation quantity measuring unit 16 each calculate correlations between measurements z and the nodes p and calculates a probability distribution of errors in difference measurements between the measurements z acquired and the nodes p (S105).

In the following, referring to FIG. 7, calculating correlations between the measurements z and the nodes $p_i$ by each unit of measurement means and probabilistic representation hereof are described.

FIG. 7 is a diagram for explaining definition of terms pertinent to the present embodiment.

Figure 7A:
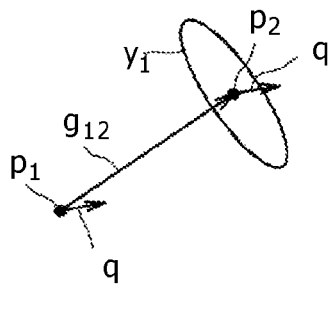
FIG. 7 is a diagram for explaining definition of terms pertinent to the present embodiment.

First, as depicted in FIG. 7A, an example is presented using node $P_1$ and node $p_2$ as positions measured by the wheel rotation quantity measuring unit 16.

A line connecting node $p_1$ and node $p_2$ is represented as arc $g_{12}$. Because node $p_2$ involves a measurement error, assuming that the measurement error complies with normal distribution, a true node $p_2$ is considered to lie within a range of ellipse $y_1$. Here, a measurement error distribution (elliptical distribution $y_1$) of node $p_2$ is represented by an precision matrix $\Omega$ of normal distribution. Here, the ellipse $y_1$ is a covariance ellipse given by the precision matrix $\Omega$. The precision matrix $\Omega$ is also called an information matrix and corresponds to an inverse matrix of a covariance matrix of normal distribution. Specifically, the ellipse $y_1$ in FIG. 7A defines a range of standard deviation $\sigma$ from the center, centered around the node $p_2$ in normal distribution.

A small arrow q indicates the orientation of the mobile object V and corresponds to $\theta_i$ in Equation (1).

Figure 7B:
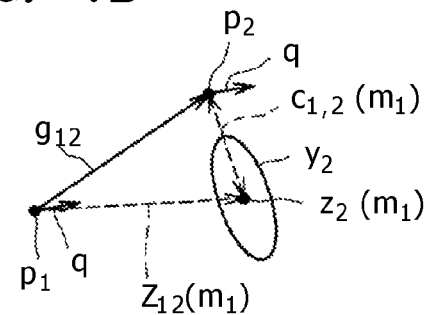

Then, referring to FIG. 7B, how to correlate a position measured by another unit of measurement means to a node measured by the wheel rotation quantity measuring unit 16 is set forth.

As depicted in FIG. 7B, it is assumed that a unit of measurement means other than the wheel rotation quantity measuring unit 16 (e.g., the GNSS positioning unit 15) measured a position. Let us refer to this position as measurement $z(m_1)$ (position data). Here, "$m_1$" is an identification number identifying a unit of measurement means (e.g., the GNSS positioning unit 15) that took the measurement z. That is, measurement $z(m_1)$ means the measurement z taken by the unit of measurement means $m_1$.

Then, the evaluation function generating unit 21 determines which node p to which the measurement $z(m_1)$ should be correlated. Given that, for example, based on time instants, correlation of the measurement $z(m_1)$ to node $p_2$ was determined by the evaluation function generating unit 21, let us denote this measurement z as measurement $z_2(m_1)$.

Here, let us denote as $Z_{12}(m_1)$ a line connecting the node $p_1$ and the measurement $z_2(m_1)$, a measurement of a difference in relative position (which hereinafter will be referred to as a difference measurement). A component of a difference measurement $Z_{12}(m_1)$ is represented by a difference between the measurement $z_2$ and the node $p_1$.

The covariance ellipse of the measurement $z_2(m_1)$ is correlated to the node p2 (in other words, the difference measurement $Z_{12}(m_1)$ and the arc $g_{12}$ are correlated). Let us denote this correlation as correlation $c_{1,2}(m_1)$.

In this way, a node p measured by the wheel rotation quantity measuring unit 16 serves as an initial value, namely, a reference value for correlation with a measurement z taken by any other unit of measurement means.

Because the measurement $z_2(m_1)$ is also considered to involve an error, the measurement $z_2(m_1)$ has a covariance ellipse y2 given by the precision matrix Ω as is the case for FIG. 7A.

Figure 7C:
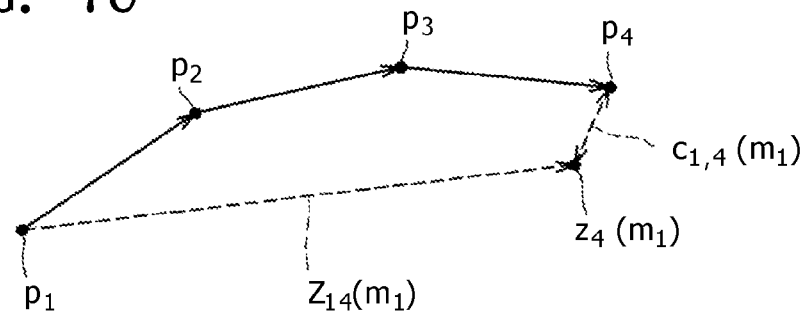

As depicted in FIG. 7C, all measurements $z_i(m_1)$ are not correlated to all nodes $p_i$. This is due to the fact that each unit of measurement means takes measurements at different intervals.

As depicted in FIG. 7C, if measurement $z_4(m_1)$ is correlated to node $p_4$, but no measurements $z(m_1)$ are acquired to be correlated to nodes $p_2$, $p_3$, measurement $z(m_1)$ in this case becomes the measurement $z_4(m_1)$ and a difference measurement as against the node $p_1$ becomes $Z_{14}(m_1)$.

A user arbitrarily sets a base point node from which a difference measurement is taken.

Figure 7D:
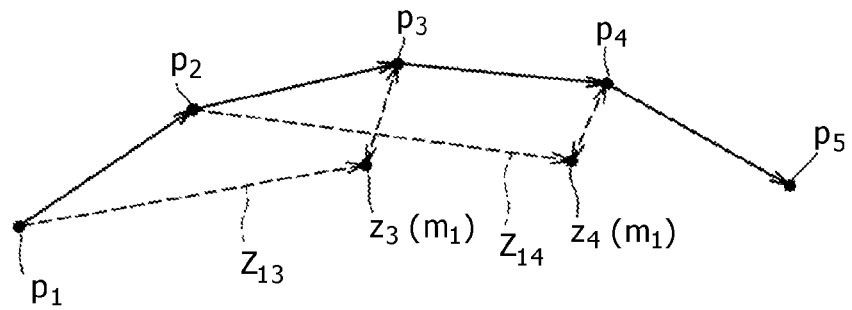

For example, as depicted in FIG. 7D, a given n-th node p before a node p correlated with a measurement z may be defined as a base point node. In an example of FIG. 7D, a second node before a node correlated with a measurement z is a base point node. That is, a base point node from which a difference measurement ($Z_{13}$) is generated to measurement $z_3(m_1)$ is node $p_1$ which is the second node before node $p_3$ correlated with the measurement $z_3(m_1)$. Also, a base point node from which a difference measurement ($Z_{24}$) is generated to measurement $z_4(m_1)$ is node $p_2$ which is the second node before node $p_4$ correlated with the measurement $z_4(m_1)$.

A way of determining a base point node from which a difference measurement is taken is not limited to the way presented in FIG. 7D.

Figure 7E:
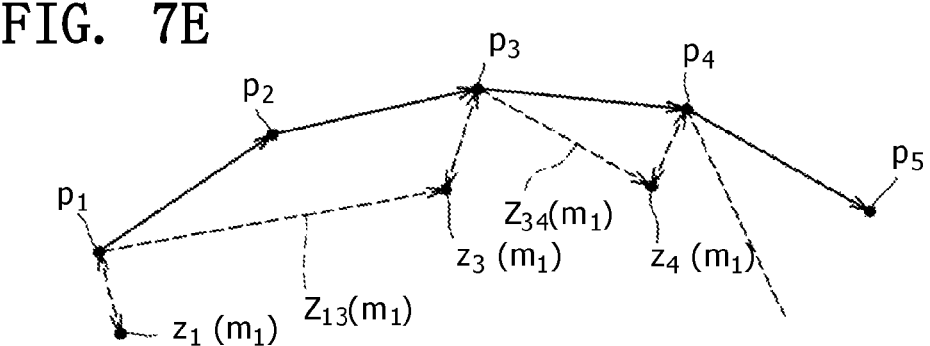

For example, as depicted in FIG. 7E, a node p which has last been correlated with a measurement z may be defined as a base point node. As depicted in FIG. 7E, let us assume that measurement $z_1(m_1)$ and node $p_1$ are correlated, measurement $z_3(m_1)$ and node $p_3$ are correlated, and measurement $z_4(m_1)$ and node $p_4$ are correlated. Here, a base point node from which a difference measurement ($Z_{13}$) is generated to measurement $z_3(m_1)$ becomes node $p_1$ which has last been correlated with a measurement z. Likewise, a base point node from which a difference measurement ($Z_{34}$) is generated to measurement $z_4(m_1)$ becomes node $p_3$ which has last been correlated with a measurement z. In turn, the measurement $z_4(m_1)$ becomes a base point node for a further difference measurement.

Because the wheel rotation quantity measuring unit 16 is also one unit of measurement means, a node p also becomes a measurement z. For example, in FIG. 7A, if the identification number of the wheel rotation quantity measuring unit 16 is assumed to be $m_0$, node $p_1$ becomes measurement $z_1(m_0)$. That is, the measurement $z_1(m_0)$ and the node $p_1$ are correlated (at the same time, measurement $z_2(m_0)$=node $p_2$). In this case, because the measurement $z_1(m_0)$ and the node $p_1$ are correlated, correlation $c_{1,2}(m_0)$ can be defined (not depicted).

As described above, each unit of the measurement means 12 and 14 to 16 calculates measurements $z_j(m_k)$ taken by it, difference measurements $Z_{i,j}$(mk), correlations $c_{i,j}(m_k)$, where i, j, k are integers and i<j.

In the following, generating a probability distribution of errors in difference measurements is described.

Based on the definition described with FIG. 7, the evaluation function generating unit 21 calculates an evaluation function to fix the locus X and fix a most likely locus Xc by calculating the positions x of the nodes p that maximize the evaluation function.

Figure 8:
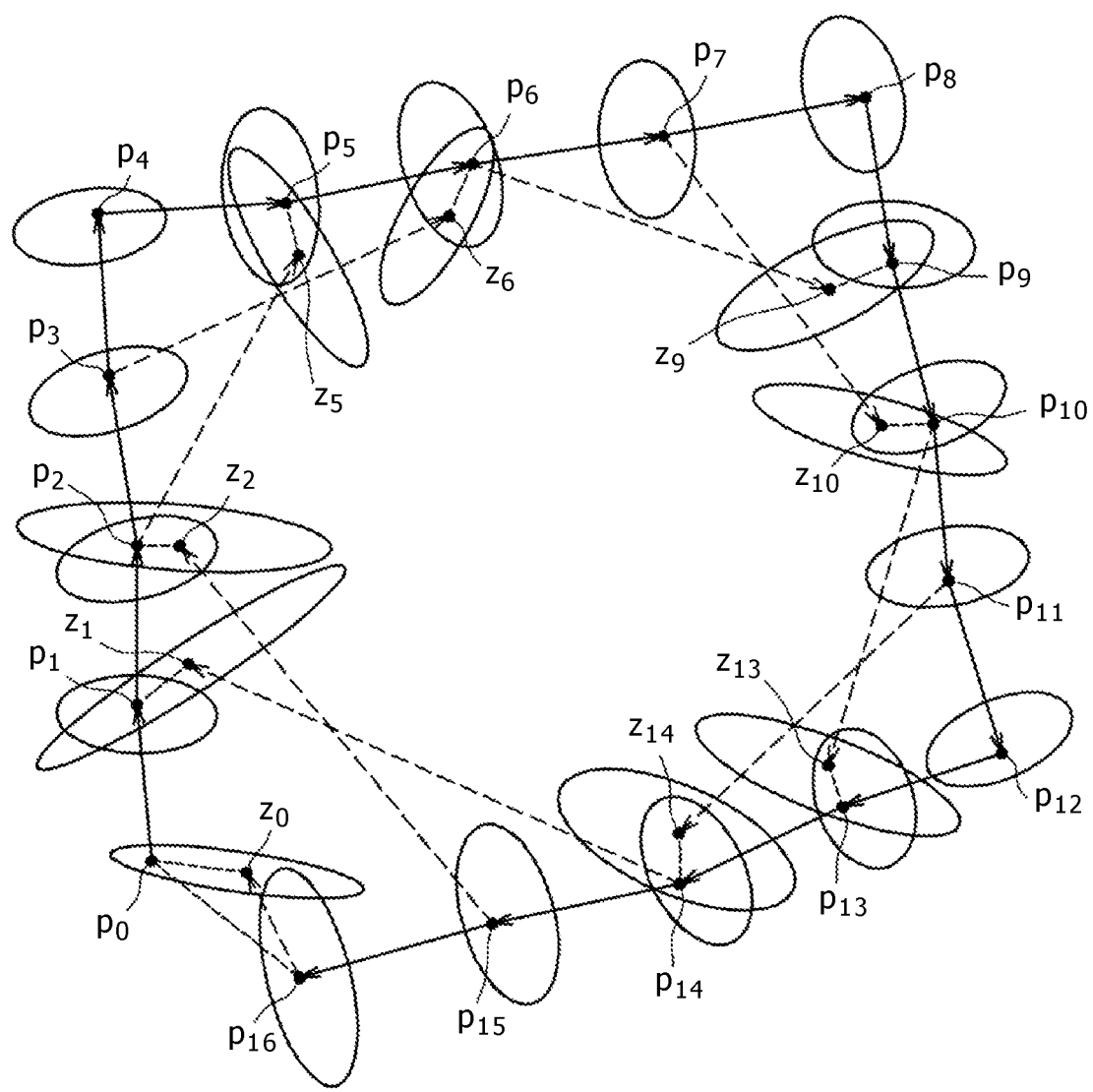
FIG. 8 is a diagram to explain fixing the locus.

FIG. 8 is a diagram to explain fixing the locus. In a locus depicted in FIG. 8 is the same as the locus X in FIG. 6.

In FIG. 8, nodes $p_0$, $p_1$, $p_2$, and so on are calculated and measurements $z_0(m_1)$, $z_1(m_1)$, $z_2(m_1)$, $z_5(m_1)$, and so on which correlate to the nodes are calculated (($m_1$) is omitted in FIG. 8). Here, a base point node from which a difference measurement is taken is defined as a third node before a node defined to be correlated with a measurement.

As described previously, the nodes $p_0$, $p_1$, $p_2$, and so on can also be regarded as measurements $z_0(m_0)$, $z_1(m_0)$, $z_2(m_0)$, respectively, but depiction of which is omitted to avoid complication ("$m_0$" is an identification number identifying the wheel rotation quantity measuring unit 16).

Here, if a probability of x∈X, where x denotes the positions of all nodes under a condition that correlations $c_{i,j}(m_k)$ (not depicted in FIG. 8) are defined for them is represented by a probability density function $p(x|c_{i,j}(m_k))$, because correlations $c_{i,j}(m_k)$ are regarded to occur independently, a probability in which the positions x occur is represented by a mixed distribution of a probability in which $x_j$ (the position of node $p_j$) occurs under the condition that the correlations $c_{i,j}(m_k)$ occur and an equation hereof is expressed by a probability density function p(x) which is provided in Equation (3). Here, x is x that is defined in Equation (2).

$$p(x) = \prod_{\substack{\langle i,j \rangle \in C \\ m_k \in M}} p(x \mid c_{i,j}(m_k)) \quad (3)$$

Here, <i, j> means all combinations of i, j for which correlations $c_{i,j}(m_k)$ are defined, C is a set of correlations $c_{i,j}(m_k)$ that may occur, and M is a set of all units of the measurement means that are used.

What is meant by Equation 3 is a probability in which the locus X occurs when the correlations $c_{i,j}(m_k)$ occur.

For example, taking measurements $z_j(m_1)$ regarding identification number $m_1$ of an unit of measurement means in FIG. 8 as an example, measurements correlated to nodes are $\{z_0(m_1), z_1(m_1), z_2(m_1), z_5(m_1), z_6(m_1), z_9(m_1), z_{10}(m_1), z_{13}(m_1),$ and $z_{14}(m_1)\}$. Hence, the probability density function that is multiplied in Equation (3) gives $\{p(x|c_{16,0}(m_1)), p(x|c_{14,1}(m_1)), p(x|c_{15,2}(m_1)), p(x|c_{2,5}(m_1)), p(x|c_{3,6}(m_1)), p(x|c_{6,9}(m_1)), p(x|c_{7,10}(m_1)), p(x|c_{10,13}(m_1)),$ and $p(x|c_{11,14}(m_1))\}$. In FIG. 8, denotation of m1 is omitted.

That is, because difference measurements $Z_{ij}$ which are contingent on the correlations $c_{i,j}(m_k)$ occur independently, the probability density function to determine a probability in which the positions x occur at the same time is represented by multiplying $p(x_j|c_{i,j}(m_k))$ with regard to measurements taken by all units of measurement means, as presented in Equation (3).

Because nodes $p_j$ taken by the wheel rotation quantity measuring unit 16 also become measurements $z_j(m_0)$ as described previously, $p(x_j|c_{i,j}(m_0))$ is also multiplied in Equation (3).

By maximizing the probability density function p(x) presented in Equation (3), the evaluation function generating unit 21 obtains a locus Xc in which no cumulative error exists and consistency is maintained throughout. Here, the locus X denotes a locus before being corrected and the locus Xc denotes a locus after being corrected. That is, maximization of the probability density function p(x) presented in Equation (3) means that the positions $x_j$ occur with the highest probability. The evaluation function generating unit 21 obtains such positions x and connecting the obtained positions x as nodes, thereby obtaining the locus Xc of the mobile object V in which no cumulative error exists and consistency is maintained throughout.

In the following, a method of calculating the locus Xc by a maximum likelihood estimation method is described.

As described with FIG. 7B, if probabilistic positions in which the positions x of the nodes p on the locus X exist are represented by normal distribution of the precision matrix $\Omega$, the probability density function $p(x|c_{i,j}(m_k))$ in Equation (3) is expressed by the following Equation (4).

$$p(x|c_{i,j}(m_k))=N(x|Z_{ij}(m_k),\Omega_{ij}^{-1}) \quad (4)$$

Here, $N(\cdot)$ is a probability density function that represents normal distribution. Specifically, Equation (4) is generated by a method described a cited document which will be mentioned later. This equation (4) gives a probability distribution of errors in difference measurements.

Then, returning to description on FIG. 2, the evaluation function generating unit 21 generates an evaluation function (S106), based on the correlations between the measurements z and the nodes p generated by each of the surrounding object shape matching unit 12, the geographical information system matching unit 14, the GNSS positioning unit 15, and the wheel rotation quantity measuring unit 16 and the probability distribution of errors in difference measurements.

The evaluation function generating unit 21 derives an evaluation function F(x) by the following procedure.

First, by assigning Equation (4) to Equation (3) and developing the latter according to a normal distribution formula, the following Equation (5) is derived.

$$p(x) = \prod_{\substack{(i,j) \in C \\ m_k \in M}} \eta_{ij} \exp\left[-\frac{1}{2}\{d_{ij}(x) - Z_{ij}(m_k)\}^T \Omega_{ij} \{d_{ij}(x) - Z_{ij}(m)\}\right] \quad (5)$$

Here, $\eta_{ij}$ is a normalized variable and $d_{ij}(x)$ is a function to obtain a difference in relative position of measurement $z_j$ correlated to a j-th node relative to an i-th node (difference measurement $Z_{ij}$). This function is a function of x. $\Omega_{ij}$ is a precision matrix for measurements $z_j(m_k)$ having correlations $c_{i,j}$. $\Omega_{ij}$ is calculated by means such as a technique described in a cited document which will be mentioned later.

By obtaining natural logarithms of both sides of Equation (5), Equation (6) is derived.

$$lnp(x) = const. - \frac{1}{2} \prod_{\substack{(i,j) \in C \\ m_k \in M}} \{d_{ij}(x) - Z_{ij}(m_k)\}^T \Omega_{ij} \{d_{ij}(x) - Z_{ij}(m_k)\} \quad (6)$$

Here, "const." is a constant. Maximizing the probability density function p(x) presented in Equation (3) is equivalent to maximizing the natural logarithms (likelihood function) of the probability density function p(x) presented in Equation (6). Hence, by removing the constant and negative coefficients from Equation (6), an evaluation function F(x) can be formulated as in Equation (7).

$$F(x) = \prod_{\substack{(i,j) \in C \\ m_k \in M}} e_{ij}^T \Omega_{ij} e_{ij} \quad (7)$$

In Equation (7), $e_{ij}$ is expressed by the following equation (8).

$$e_{ij} = d_{ij}(x) - Z_{ij}(m_k) \quad (8)$$

Here, maximizing the probability density function p(x) presented in Equation (3) is equivalent to minimizing the evaluation function F(x) presented in Equation (7). Hence, minimizing the evaluation function F(x) corresponds to optimizing the evaluation function F(x).

That is, at step S106 in FIG. 2, the evaluation function generating unit 21 calculates the evaluation function F(x) presented in Equation (7) based on the measurements $z_j(m_k)$ acquired by the surrounding object shape matching unit 12, the geographical information system matching unit 14, the GNSS positioning unit 15, and the wheel rotation quantity measuring unit 16.

Next, the control unit 17 determines whether the mobile object V has completed traveling in the traveling environment for the intended interval, that is, determines whether the traveling of the mobile object V has finished (S107), thereby determining whether acquisition of surrounding object shape data has finished.

As a result of step S107, if the traveling has not finished (No, S107), the control unit 17 returns the process to step S101.

As a result of step S107, if the traveling has finished (Yes, S107), the locus optimization calculation unit 22 rectifies the locus X of the mobile object V with a cumulative error occurring in it to the locus Xc of the mobile object V in which no cumulative error exists and consistency is maintained throughout by optimizing the evaluation function F(x) presented in Equation (7) (S108).

Figure 9:
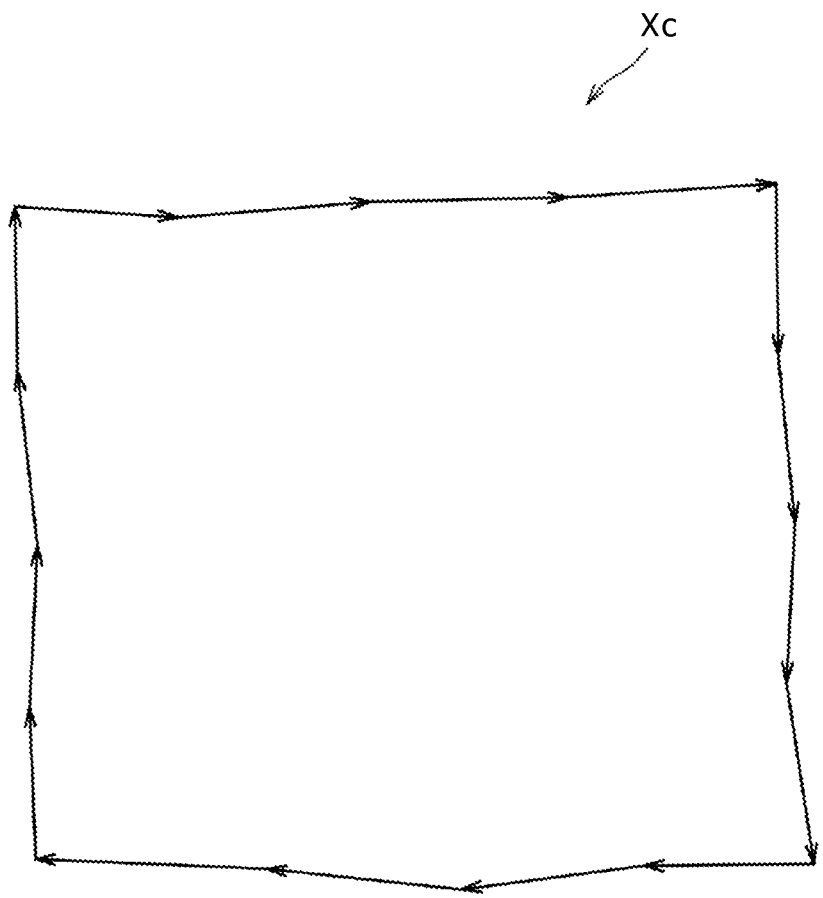
FIG. 9 is a diagram presenting an example a rectified locus.

As described previously, maximizing the probability density function p(x) of Equation is equivalent to minimizing the evaluation function F(x) presented in Equations (7) and (8). That is, the locus optimization calculation unit 22 optimizes the evaluation function F(x) by obtaining the positions x of the nodes p that minimize the evaluation function F(x) by Equation (9) provided below. By doing so, the locus optimization calculation unit 22 rectifies the locus X (FIG. 6) acquired by the wheel rotation quantity measuring unit 16 to the locus Xc of the mobile object V in which no cumulative error exists and consistency is maintained throughout, as is depicted in FIG. 9. The locus optimization calculation unit 22 minimizes the evaluation function F(x) by a method of solving a system of equations and a non-linear optimization method.

$$Xc = \underset{x}{\operatorname{argmin}} F(x) \qquad (9)$$

Then, the shape map data generating unit 23 generates a map by pasting surrounding object shape data measured by the surrounding object shape measuring unit 11 to the rectified locus Xc of the mobile object V (S109). Consequently, it is possible to generate an accurate map by, after the acquisition of all surrounding object shape data in the traveling environment for an intended interval for generating a map, estimating the locus Xc of the mobile object V in which no cumulative error exists and consistency is maintained throughout measurement data and pasting the measured surrounding object shape data to this locus Xc, instead of generating a map while estimating its own location by time-sequential mapping.

While the nodes p are generated from measurement data taken by the wheel rotation quantity measuring unit 16 in the present embodiment, the nodes p may be generated from measurement data taken by another unit of measurement means. That is, measurement data taken by another unit of measurement means may be used as reference values.

Calculating the Correlations and the Probability Distribution of Errors in Difference Measurements by Each Unit of Measurement Means Next, referring to FIGS. 10 through 15, processing by each unit of measurement means at step S105 in FIG. 2 is described.

Surrounding Object Shape Matching Unit

Figure 10:
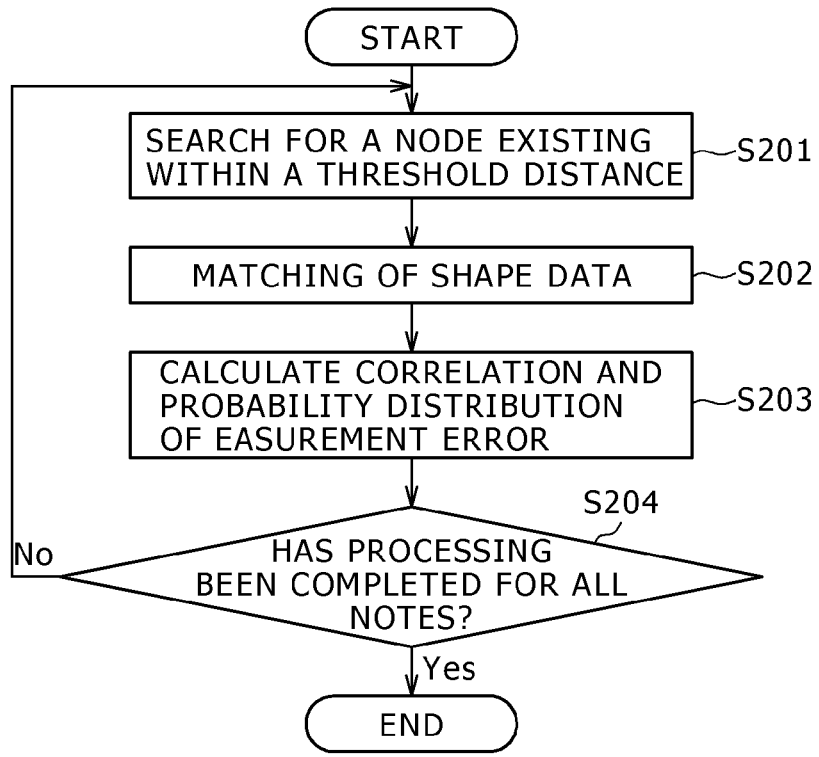
FIG. 10 is a flowchart illustrating a processing procedure for calculating correlations and a probability distribution of errors in difference measurements by a surrounding object shape matching unit.

FIG. 10 is a flowchart illustrating a processing procedure of step S105 by the surrounding object shape matching unit.

The surrounding object shape matching unit 12 focuses on an i-th node $p_i$ and a j-th node $p_j$ and calculates correlations of a measurement z acquired by the surrounding object shape matching unit 12 with the node $p_i$ and the node $p_j$ by matching (overlaying) surrounding object shape data measured by the surrounding object shape measuring unit 11 at the point of the i-th node $p_i$ against (on) surrounding object shape data measured at the point of the j-th node $p_j$.

The surrounding object shape measuring unit 11 searches for a node p existing within a predetermined threshold distance from the i-th node $p_i$ being targeted now (S201) and determines the mating j-th node $p_j$.

Then, the surrounding object shape measuring unit 11 matches surrounding object shape data measured by the at the point of the i-th node $p_i$ against surrounding object shape measuring unit 11 itself at the point of the i-th node $p_i$ against surrounding object shape data measured at the point of the j-th node $p_j$ (S202). A result of this matching gives a measurement z. For this matching, for example, a method described in "Range Data Processing; Technique for Generating a Shape Model from Multiple Range Images" (authored by Ken Masuda, Ikuko Okaya (Shimizu), Tatuaki Sagawa, Proc. of the 146th CVIM conference held in 2004) can be used, among others.

Then, using the matching result at step S202, the surrounding object shape measuring unit 11 calculates the probability distribution (probability density function; Equation (4)) of an error in a difference measurement regarding measurement $z_j$ (S203). To calculate the probability distribution of an error in a difference measurement, for example, a method described in a paper "Likelihood Distribution Calculation for Robot Orientation in Scan Matching" (authored by Tadahiro Tomonou, Proc. Of the RSJ'10 conference held in 2010) can be used, among others.

In turn, the surrounding object shape measuring unit 11 determines whether the processing of steps 201 to 203 has been completed for all nodes in the traveling environment for an intended interval for generating a map (S204).

As a result of step S204, the processing has not been completed (No, step 204), the surrounding object shape measuring unit 11 returns the process to step S201.

As a result of step S204, the processing has been completed (Yes, step 204), the surrounding object shape measuring unit 11 terminates the process.

Geographical Information System Matching Unit

Figure 11:
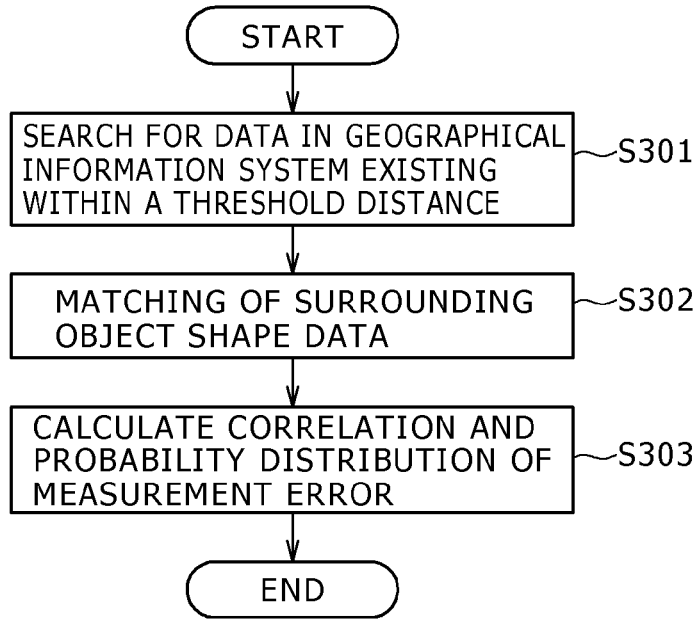
FIG. 11 is a flowchart illustrating a processing procedure for calculating correlations and a probability distribution of errors in difference measurements by a geographical information system matching unit.

FIG. 11 is a flowchart illustrating a processing procedure of step S105 by the geographical information system matching unit.

The geographical information system matching unit 14 calculates a correlation with a node and the probability distribution (probability density function; Equation (4)) of an error in a difference measurement on map data possessed by the geographical information system by matching (overlapping) surrounding object shape data measured by the surrounding object shape measuring unit 11 at the targeted node p against shape data on the map acquired by the geographical information system data acquiring unit 13.

First, the geographical information system matching unit 14 searches for data in the geographical information system existing within a predetermined threshold distance from the node $p_i$ being targeted now via the geographical information system data acquiring unit 13 (S301).

In turn, the geographical information system matching unit 14 matches surrounding object shape data measured by the surrounding object shape measuring unit 11 at the targeted node p against the searched data, i.e., shape data on the map acquired by the geographical information system data acquiring unit 13 (S302). A result of this matching gives a measurement z. For matching, the same method as used in the processing of step S202 in FIG. 10 can be used.

Then, using the matching result at step S302, the geographical information system matching unit 14 calculates a correlation between the measurement z and the node p and calculates the probability distribution (probability density function; Equation (4)) of an error in a difference measurement (S303). To calculate the probability distribution of an error in a difference measurement, the same method as used in step S203 in FIG. 10 can be used.

GNSS Positioning Unit

Figure 12:
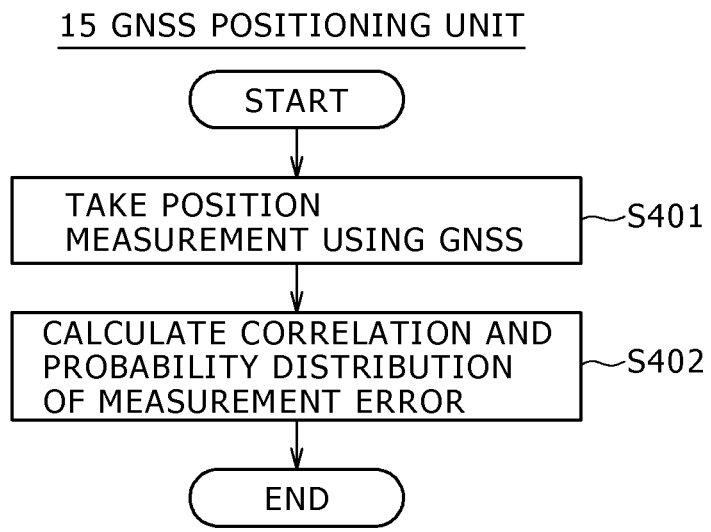
FIG. 12 is a flowchart illustrating a processing procedure for calculating correlations and a probability distribution of errors in difference measurements by a GNSS positioning unit.

FIG. 12 is a flowchart illustrating a processing procedure of step S105 by the GNSS positioning unit.

The GNSS positioning unit 15 calculates a correlation $c_{i,j}$ on a normal coordinate system such as, for example, a plane rectangular coordinate system.

First, the GNSS positioning unit 15 takes a position measurement z at the node p being targeted now on the normal coordinate system using GNSS (S401).

In turn, using the position measurement result (measurement z) at step S401, the GNSS positioning unit 15 calculates a correlation with the node p and the probability distribution of an error in the measurement z (S402). To calculate the probability distribution of an error in the measurement z, for example, information relevant to GST sentences of an NMEA-0183 format which is a communication protocol for use in the GNSS can be used, among others.

Wheel Rotation Quantity Measuring Unit

Figure 13:
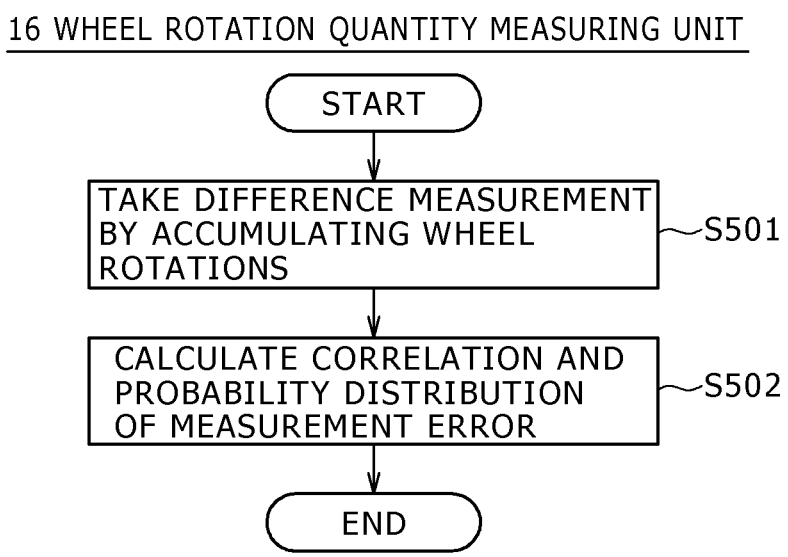
FIG. 13 is a flowchart illustrating a processing procedure for calculating correlations and a probability distribution of errors in difference measurements by a wheel rotation quantity measuring unit.

FIG. 13 is a flowchart illustrating a processing procedure of step S105 by the wheel rotation quantity measuring unit.

The wheel rotation quantity measuring unit 16 calculates a correlation $c_{i,j}$ when taking a measurement z at a node p, the current position of the mobile object V, against a node p at which the mobile object V was located at the previous time instant by accumulating wheel rotations.

First, the wheel rotation quantity measuring unit 16 takes a measurement z at node $p_j$, the current position of the mobile object V, and takes its difference measurement $Z_{ij}$ relative to node $p_i$ at which the mobile object V was located at the previous time instant by accumulating wheel rotations (S501). When doing so, a method described in a paper "Gyrodometry: A New Method for Combining Data from Gyros and Odometry in Mobile Robots" (authored by Johann Borenstein and Liqiang Feng, Proc. of the ICRA'96 conference held in 1996) can be used, among others, through the use of an inertial sensor called an IMU (Inertial Measurement Unit) or a gyro sensor.

Then, using the measurement result at step S501, the wheel rotation quantity measuring unit 16 calculates a correlation $c_{i,j}$ of the measurement z to the node $p_j$ and the probability distribution (probability density function; Equation (4)) of an error in the difference measurement $Z_{ij}$ (S502). To calculate the probability density distribution of an error in the measurement z, for example, a method described in a book "Vehicle" (authored by Kimio Kanai, et al., published by Corona Publishing Co., Ltd. in 2003) can be used, among others.

Other Embodiments

Figure 14:
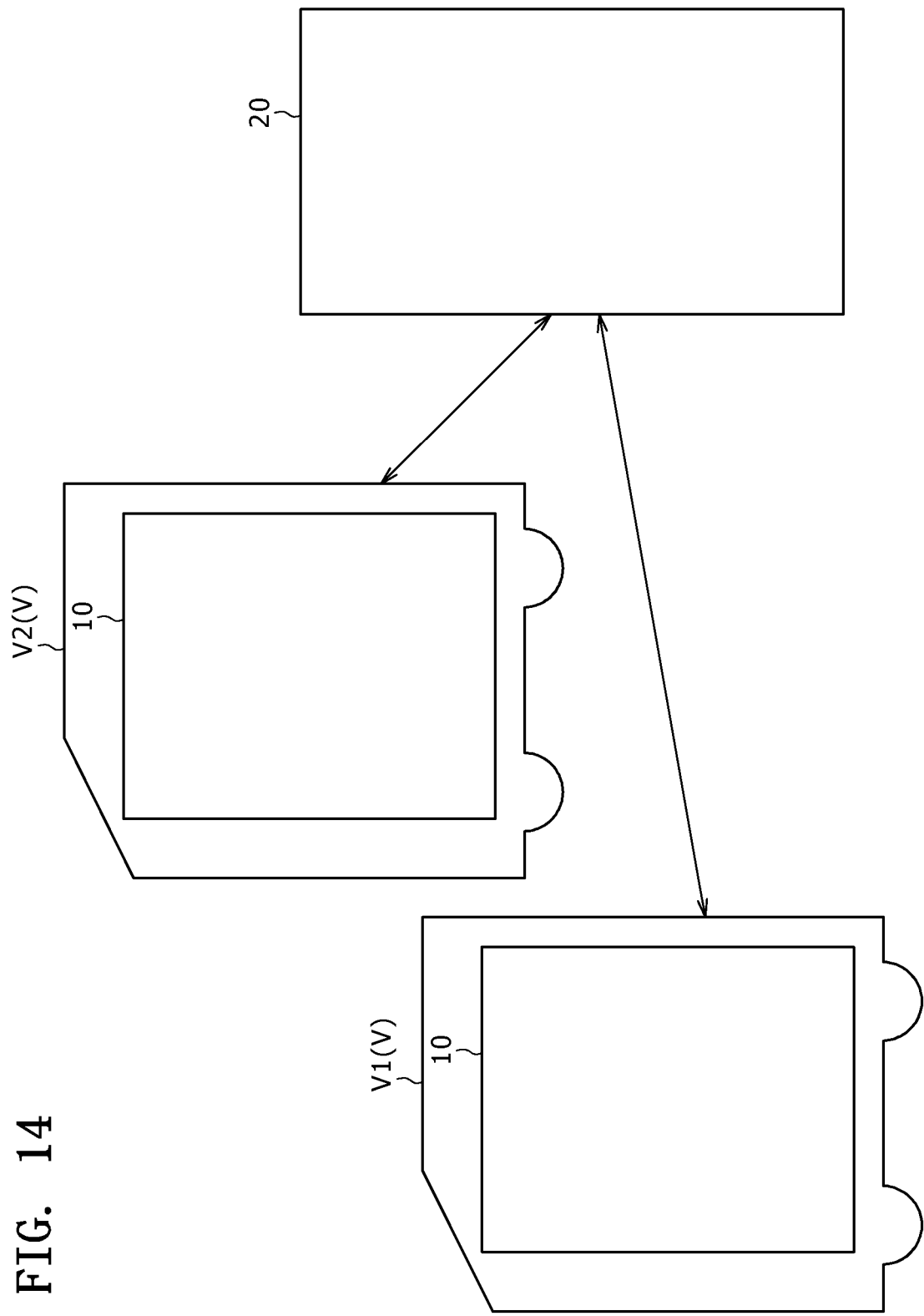
FIG. 14 is a diagram depicting another embodiment of an autonomous traveling system pertinent to the present embodiment (Part 1).

FIG. 14 is a diagram depicting another embodiment of an autonomous traveling system pertinent to the present embodiment.

While one mobile object V and the administrative part 20 communicates with each other in FIG. 1, onboard parts 10 mounted in a plurality of mobile objects V1, V2 (V) may communicate with the administrative part 20, as depicted in FIG. 14. In this case, the administrative part 20 generates an evaluation function and obtains a locus Xc, based on data corrected from the respective onboard parts 10.

Alternatively, the respective onboard parts 10 may not include all the units 11 to 15 (however, all the onboard parts 10 have to include the wheel rotation quantity measuring unit 16). In this case, the administrative part 20 may integrate measurement data collected from the respective onboard parts 10, generate an evaluation function, and obtain a locus Xc.

Figure 15:
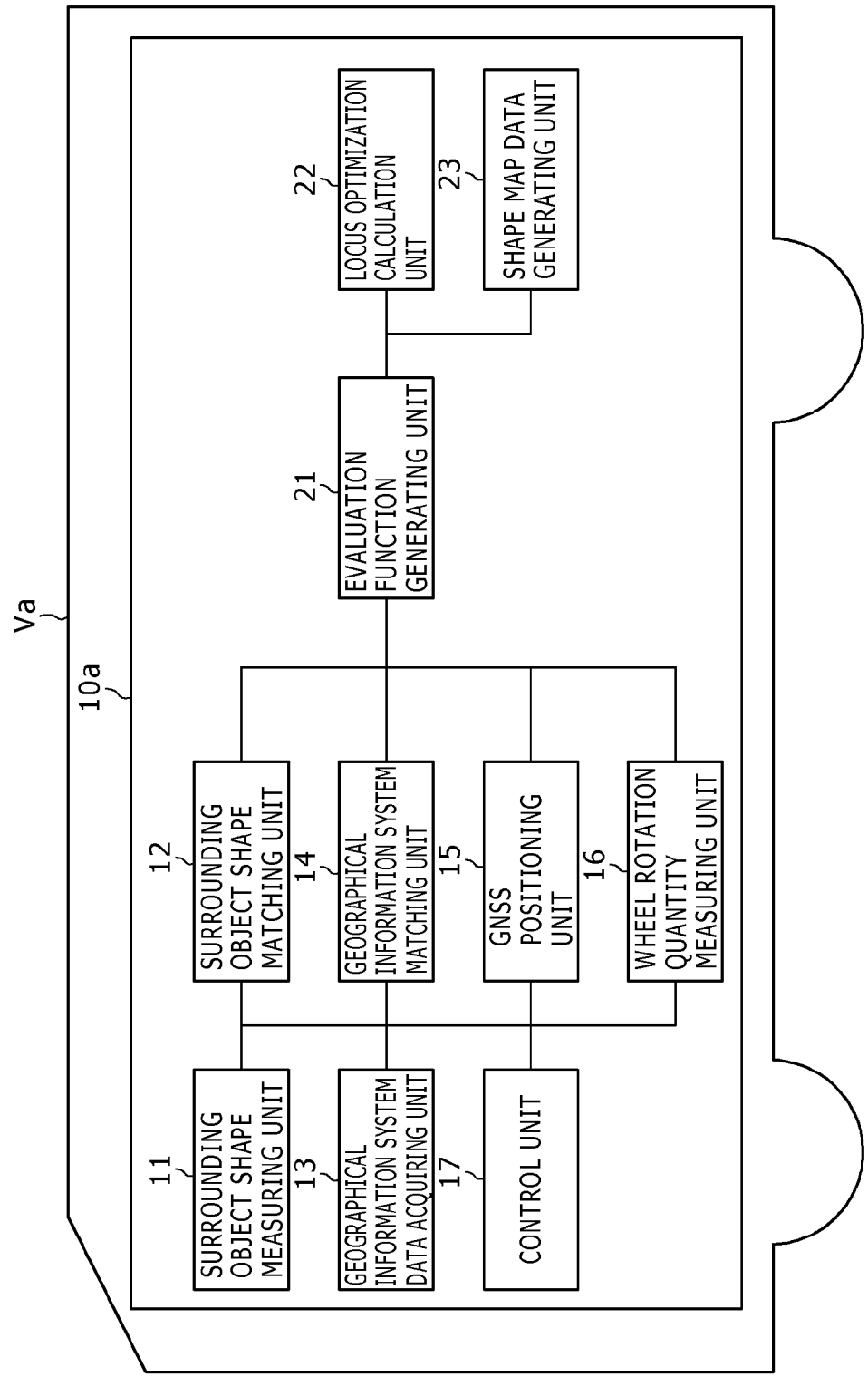
FIG. 15 is a diagram depicting another embodiment of an autonomous traveling system pertinent to the present embodiment (Part 2).

FIG. 15 is a diagram depicting another embodiment of an autonomous traveling system pertinent to the present embodiment.

As depicted in FIG. 15, the functions of the onboard part 10 and the administrative part 20 in FIG. 1 may be provided in an onboard part 10a of a mobile object V.

Thereby, it becomes possible to correct a locus and make a map only by the mobile object Va.

CONCLUSION

According to the present embodiment, by generating an evaluation function and optimizing the evaluation function based data acquired from a plurality of units of measurement means, it is possible to estimate a locus Xc of the mobile object V in which no cumulative error exists and consistency is maintained throughout from the locus X of the mobile object V involving an error. By pasting surrounding object shape data to the locus Xc, an accurate map without error accumulation can be generated.

Consequently, the mobile object V autonomously moves based on such a map, so that the mobile object V can reach its destination without losing sight of its location and an intended route.

Stated differently, according to the present embodiment, an autonomous mobile system is realized that generates an accurate map by, after the acquisition of all shape data in the traveling environment for an intended interval for generating a map, estimating a locus of the mobile object V in which no cumulative error exists and consistency is maintained throughout measurement data and pasting the measured surrounding object shape data to the locus, instead of generating a map while estimating its own location by time-sequential mapping, and reaches its destination without losing sight of its location and an intended route.

LIST OF REFERENCE SIGNS

1 Autonomous mobile system
10, 10a Onboard part
11 Surrounding object shape measuring unit
12 Surrounding object shape matching unit
13 Geographical information system data acquiring unit
14 Geographical information system matching unit
15 GNSS positioning unit
16 Wheel rotation quantity measuring unit
17 Control unit
20 Administrative part (Locus correcting apparatus)
21 Evaluation function generating unit
22 Locus optimization calculation unit
23 Shape map data generating unit
V, V1, V2, Va Mobile object (Mobile object equipment)

The invention claimed is:

1. A computer-implemented locus correcting method for correcting a traveling locus of a mobile object by a locus correcting apparatus, the locus correcting apparatus comprising a plurality of measurement means, wherein
the locus correcting apparatus performs:
setting, using a processor, a plurality of nodes on locus data of the mobile object acquired by one unit of measurement means;
correlating, using the processor, position data of the mobile object acquired by the one unit of measurement means to the nodes and correlating, using at least one node of the plurality of nodes as a reference value, position data of the mobile object acquired by other units of measurement means than the one unit of measurement means to the nodes;
representing, using the processor, positions at which the nodes may occur by probability;

representing, using the processor, positions at which position data correlated to the nodes may occur by probability;

calculating, using the processor, an evaluation function including the nodes and the position data as variables, based on each probability; and calculating, using the processor, a locus on which each node occurs with largest probability, based on the evaluation function.

2. The computer-implemented locus correcting method according to claim 1 characterized in that:

the probability is represented by a probability density function;

the evaluation function is a likelihood function; and the locus correcting apparatus calculates a locus on which the each node occurs with largest probability according to a maximum likelihood estimation method.

3. The computer-implemented locus correcting method according to claim 1 characterized in that:

the locus correcting apparatus makes a map by pasting shape data of structures around the calculated locus.

4. A computer-implemented locus correcting apparatus for correcting a traveling locus of a mobile object, the locus correcting apparatus comprising:

a plurality of measurement means;

an evaluation function generating unit; and a locus optimization calculation unit, wherein the evaluation function generation unit that performs:

setting a plurality of nodes on locus data of the mobile object acquired by one unit of the measurement means, correlating position data of the mobile object acquired by the one unit of the measurement means to the nodes and correlating, using at least one node of the plurality of nodes as a reference value, position data of the mobile object acquired by other units of the measurement means than the one unit of the measurement means to the nodes, representing positions at which the nodes may occur by probability, representing positions at which position data correlated to the nodes may occur by probability, and calculating an evaluation function including the nodes and the position data as variables, based on each probability; and the locus optimization calculation unit that calculates a locus on which each node occurs with largest probability, based on the evaluation function.

5. A mobile object equipment characterized by being equipped with the computer-implemented locus correcting apparatus according to claim 4.

* * * * *